United States Patent [19]
Jahnke

[11] Patent Number: 6,061,936
[45] Date of Patent: May 16, 2000

[54] SYNTHESIS GAS EXPANDER LOCATED IMMEDIATELY UPSTREAM OF COMBUSTION TURBINE

[75] Inventor: Frederick C. Jahnke, Rye, N.Y.

[73] Assignee: Texaco Inc., White Plains, N.Y.

[21] Appl. No.: 09/139,917

[22] Filed: Aug. 26, 1998

[51] Int. Cl.[7] ................................................ F02C 13/10
[52] U.S. Cl. ......................................................... 39/2; 39/12
[58] Field of Search ................................ 60/39.02, 39.12

[56] References Cited

U.S. PATENT DOCUMENTS

| | | |
|---|---|---|
| 2,592,749 | 4/1952 | Sedille et al. . |
| 4,028,883 | 6/1977 | Meyer-Kahrweg . |
| 4,199,933 | 4/1980 | Pfenninger . |
| 4,733,528 | 3/1988 | Pinto . |
| 5,220,781 | 6/1993 | Keller ........................................ 60/39.02 |
| 5,289,676 | 3/1994 | Brown et al. ........................... 60/39.02 |
| 5,715,671 | 2/1998 | Griffiths ................................. 60/39.02 |

*Primary Examiner*—Ehud Gartenberg
*Attorney, Agent, or Firm*—Harold J. Delhommer; Rodman & Rodman

[57] ABSTRACT

The invention improves the reliability and efficiency of the burning of a synthesis gas as a fuel for a combustion turbine to produce power by incorporating a synthesis gas expander immediately upstream of the combustion turbine. Increased efficiency occurs from the additional power output from the expander and by a reduction or elimination of nitrogen compression from an air separation unit for the control of oxides of nitrogen.

8 Claims, 4 Drawing Sheets

SYNTHESIS GAS EXPANDER LOCATED IMMEDIATELY UPSTREAM OF COMBUSTION TURBINE

BACKGROUND OF THE INVENTION

1. Field of the Invention

This invention relates to improvements in the production of fuel gas by the partial oxidation of hydrocarbonaceous fuels and the burning of such fuel gas in a gas turbine for the production of power, and more specifically, to a highly efficient integrated gasification combined cycle ("IGCC") process which incorporates gas cooling in stages and which operates at high pressure to allow maximum heat from the quenched fuel gas to be used in power generation.

2. Background of the Invention

Quench power generation systems are used throughout the world to generate power from the gasification of a fuel source. In such systems a raw synthesis gas or syngas fuel gas stream, comprising $H_2$, CO, $CO_2$, and $H_2O$, is produced by the partial oxidation reaction of a hydrocarbonaceous fuel with a free-oxygen containing gas, typically in the presence of a temperature moderator in a quench gasification reactor.

The syngas produced is cooled by quenching in water to produce a stream of quenched saturated syngas at a temperature typically in the range of about 450° F. to 550° F. and typically at a pressure of about 700 to 1500 psia. A more detailed description of one such process appears in U.S. Pat. No. 5,345,756 to Jahnke et al, which is incorporated herein by reference.

The syngas produced is generally purified in an acid gas removal unit employing a physical or chemical solvent to remove $H_2S$ and COS from the gas stream. The purified syngas is then fed as a fuel gas to the combustor of a gas turbine with a temperature moderator such as nitrogen.

SUMMARY OF THE INVENTION

The invention improves the reliability and efficiency of the burning of a synthesis gas as a fuel for a combustion turbine to produce power by incorporating a synthesis gas expansion turbine or expander immediately upstream of the combustion turbine. Increased efficiency occurs from the additional power output from the expander and by a reduction or elimination of nitrogen compression from an air separation unit for the control of oxides of nitrogen.

BRIEF DESCRIPTION OF THE DRAWINGS

Corresponding reference numbers indicate corresponding parts in each of the Figures.

DESCRIPTION OF THE PREFERRED EMBODIMENTS

In accordance with the present invention the syngas expander or expansion turbine is located immediately upstream of the combustion turbine. The syngas mixture entering the expander is at a high temperature of about 800° F. to about 1000° F. Because the gas entering the expander is at high temperature, a large amount of power can be extracted from the expanding volume of the hot syngas before it enters a combustion turbine, thereby greatly improving the efficiency of the power production cycle. The fuel gas exiting the expander remains hot, and any heat not converted to power by the expander is carried directly into the combustion turbine where it is recovered.

In one embodiment of the invention a bleed stream of hot air is removed from the discharge of the combustion turbine compressor prior to entry in the combustor section of the combustion turbine. The bleed stream of hot air is cooled by heat exchange with other process streams or by any other cooling means that may be accomplished efficiently.

After cooling, the air stream can be saturated with water and compressed to about 1000 psig to about 1200 psig. The air stream can also be saturated with water or nitrogen to improve the efficiency of the cycle even though the water taken up by the air stream will increase the load of the compressor.

Alternatively, the air or gas stream can be saturated or receive additional saturation downstream of a secondary compressor. However, at this point, the gas stream becomes heated as a result of the heat of compression and the use of a saturator is not as efficient.

As an additional option, part of the air from the combustion turbine can be directed to an air separation unit which enables a reduction in size and power of the air separation unit air compressor. Also as a further option, nitrogen from the air separation unit can be compressed and sent to the combustion turbine or to the syngas or air upstream of the expander to increase power output and reduce oxides of nitrogen ($NO_x$) formation in the combustion turbine.

Figure 1:
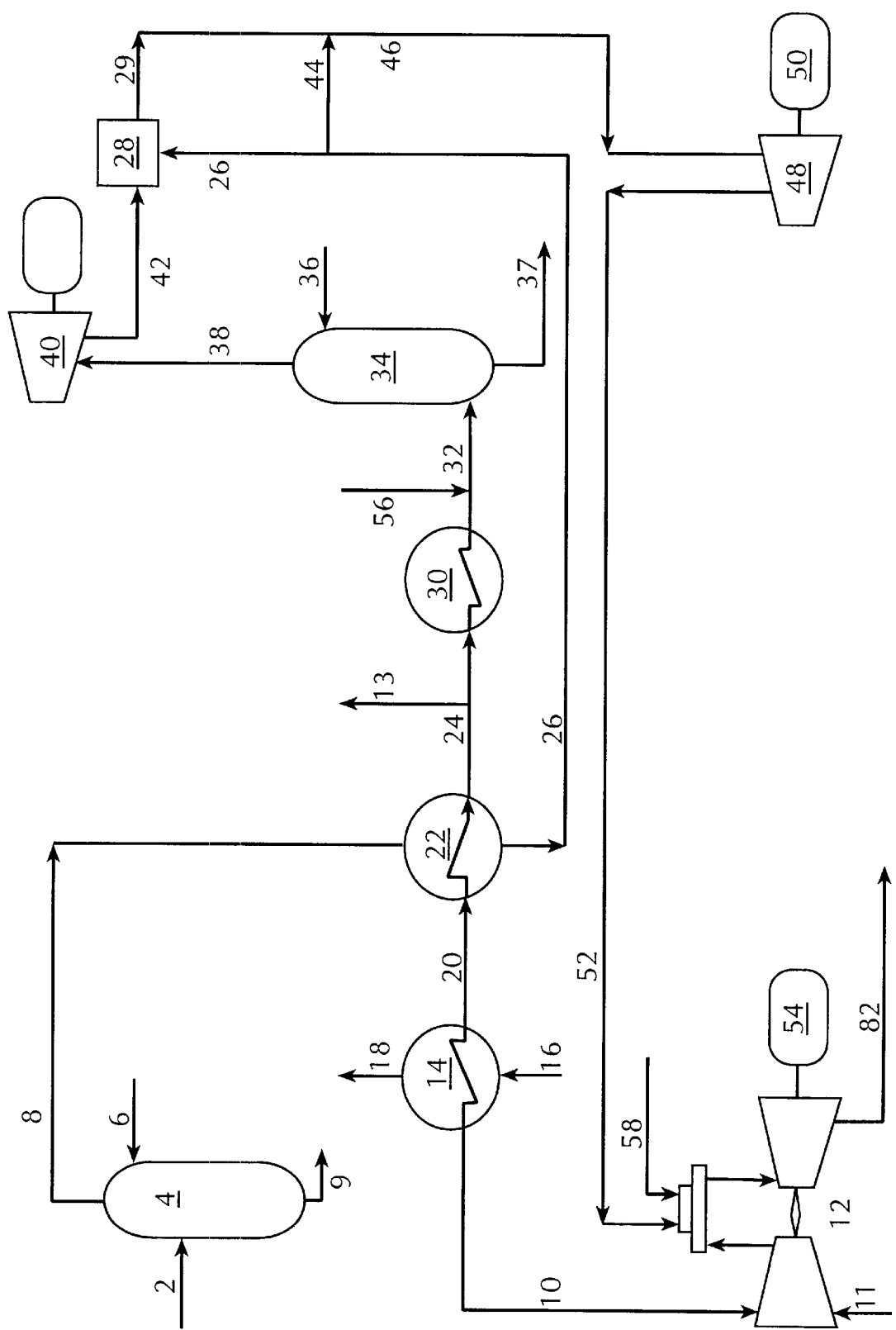
FIG. 1 is a schematic flow diagram of an embodiment using bleed air from the combustion turbine as the oxygen source for partial burning of the syngas in a combustor.

Referring now to FIG. 1, a high pressure sweet syngas 2 from the acid gas removal unit (not shown) enters the syngas saturator 4 where it is saturated with water 6 and exits as saturated syngas stream 8. The syngas saturator 4 is also equipped with a water output 9.

A hot bleed air stream 10, at a pressure of about 200 to 300 psig and a temperature of about 500° F. to about 800° F. is drawn off from the combustion turbine 12 and passes through the first heat exchanger 14 where it releases heat to an entering boiler feed water stream 16 to form high pressure steam stream 18. Cooled air stream 20 exits heat exchanger 14 and enters the second heat exchanger 22 where it is further cooled and exits as further cooled air stream 24. Optionally, a portion 13 of the cooled air stream 24 may be cycled to the air separation unit. Combustion turbine 12 is also equipped with an air input 11.

The cooled air stream 24 enters the third heat exchanger 30, where it is further cooled and exits as cooled air stream 32 which enters the air saturator 34 where the air is saturated with water entering from line 36. The saturator is equipped with a water outlet 37.

The saturated air 38 exits air saturator 34 and enters the secondary compressor 40 where it is compressed from about 200–300 psig to about 1000–1200 psig, which is the typical operating pressure of the gasifier, and exits as compressed air stream 42 which enters combustor 28 along with syngas stream 26.

The saturated syngas stream 8 passes through heat exchanger 22 where it is heated in exchange with the air passing through and exits as heated saturated syngas stream 26 and enters the combustor 28, where it undergoes combustion.

An intercooler, not shown, can optionally be used with the secondary compressor 40. However, since the heat of compression enters combustor 28 and the extra energy is converted to fuel value, a high compression ratio without interstage cooling may be practical.

As noted, compressed air stream 42 enters combustor 28 with syngas stream 26 and undergoes combustion to produce a mixture of combustion products and excess syngas at a high temperature.

Generally, only a portion of the syngas stream 26 on the order of about 1% to about 5% of the total syngas undergoes combustion in combustor 28. The bulk of the high pressure syngas bypasses the combustor 28 through line 44 and is mixed with the combustion gases 29 exiting the combustor 28 to form the mixture 46 of combustion gases 29 and syngas 44 at a temperature of about 1000° F.

The temperature in the combustion chamber of the combustor 28 can be modified by adjusting the amount of syngas in stream 44 bypassing the combustor 28. If smaller quantities of syngas are routed though the combustor 28 significantly higher temperatures in the unmixed gas stream 29 can be obtained.

Mixed gas stream 46 then enters the expander 48, which is coupled to a generator 50. A larger amount of power from the expander 48 can be readily extracted by the generator 50, due to the syngas heating improving the efficiency of the cycle. The gases 52 exiting the expander 48 will remain hot, at temperatures of about 250° F. to about 700° F. The hot gases 52 serve as fuel for the combustion turbine 12. Thus, any heat from the gases 46 not converted to power by the expander 48 will exit as heat in the fuel gas 52 to the combustion turbine 12 and be recovered by the generator 54.

By properly controlling the operation of the system, the fuel gas 52 exiting the expander 48 can be maintained at a low enough BTU/standard cubic foot (BTU/SCF) level to minimize the production of oxides of nitrogen ($NO_x$) while at the same time maintaining a sufficiently high heating value on the order of about 80 to about 150 BTU/SCF, to assure effective and efficient combustion in the combustion turbine 12.

The heating value of the fuel gas 52 is controlled by controlling the amount of air used to pre-combust a portion of the syngas 26 in the combustor 28 prior to the entry of gas stream 46 in the expander 48 and by the amount of saturation water 36 added to the high pressure air entering air saturator 34. Optionally, a nitrogen or syngas stream can be added to the fuel stream prior to entering the expander, or downstream of the expander through optional line 58 in combustion turbine 12.

Figure 2:
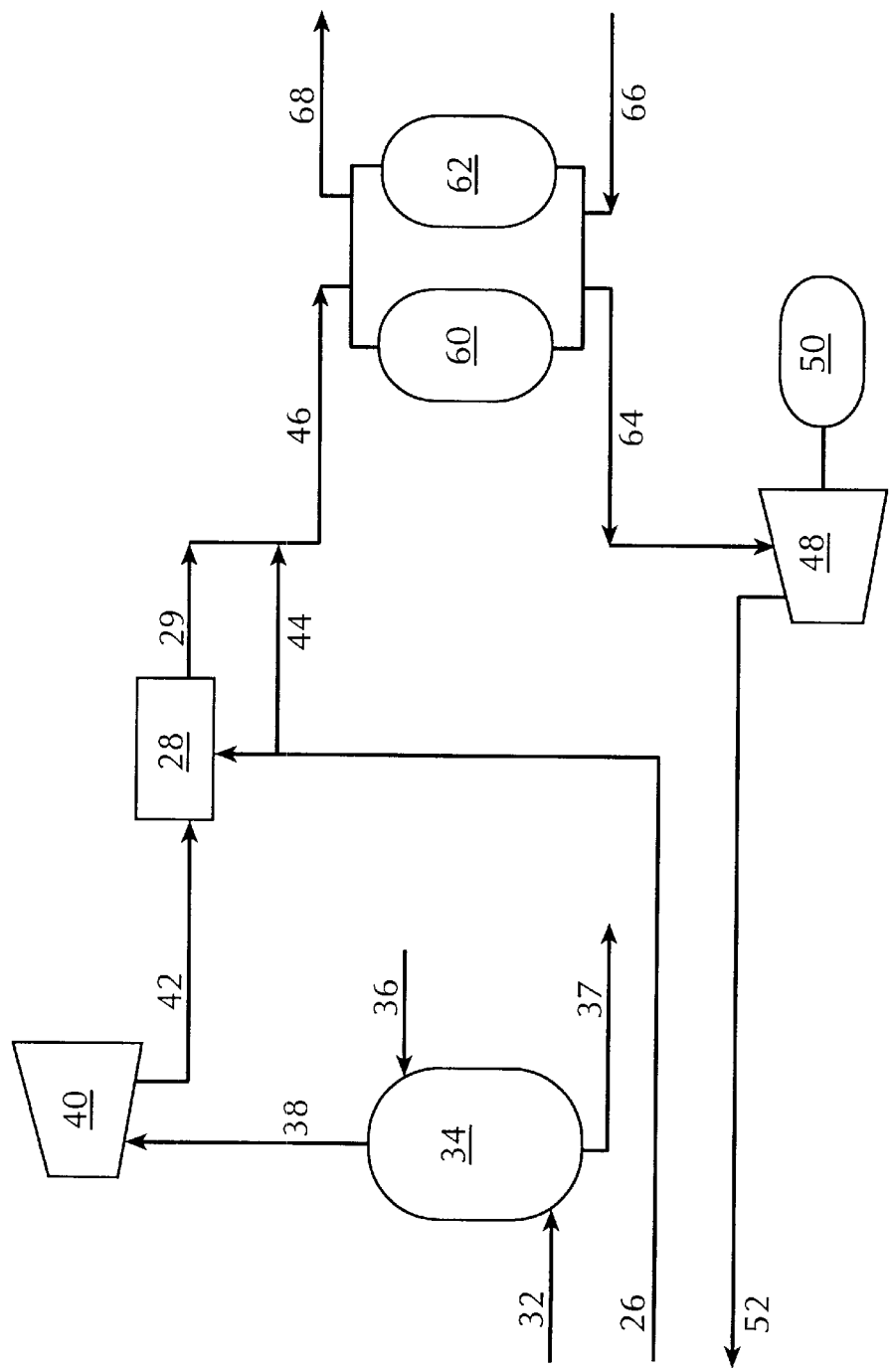
FIG. 2 is a schematic flow diagram of the embodiment of FIG. 1 including an optional desulfurization system.

FIG. 2 is a high temperature desulfurization embodiment where the combined combustion gases 46 resulting from the combustor 28 and bypass syngas stream 44 enter a high temperature desulfurization system consisting of beds 60 and 62 of zinc ferrite or other similar material and exit through line 64 depleted of sulfur.

The combustion gas 46 that enters the high temperature desulfurization system has already had the majority of its sulfur content removed through one of the conventional low temperature desulfurization processes well known to those skilled in the art. Many of these processes include a COS hydrolysis step to increase the sulfur removal by about 1–2%.

Utilizing the high temperature desulfurization system described herein eliminates the need for COS hydrolysis and removes the last traces of sulfur. Because the desulfurization system operates only on the last traces of sulfur, the size of the high temperature desulfurization system is very small in relation to a system removing all of the sulfur from the syngas. In addition, the sour gases from the regeneration of beds 60 and 62, using steam and $O_2$ introduced through line 66, can be returned through line 68 to the gasifier (not shown), eliminating the need for any additional sulfur recovery processing and making batch processing or the regeneration of the sulfur removal beds practical.

Figure 3:
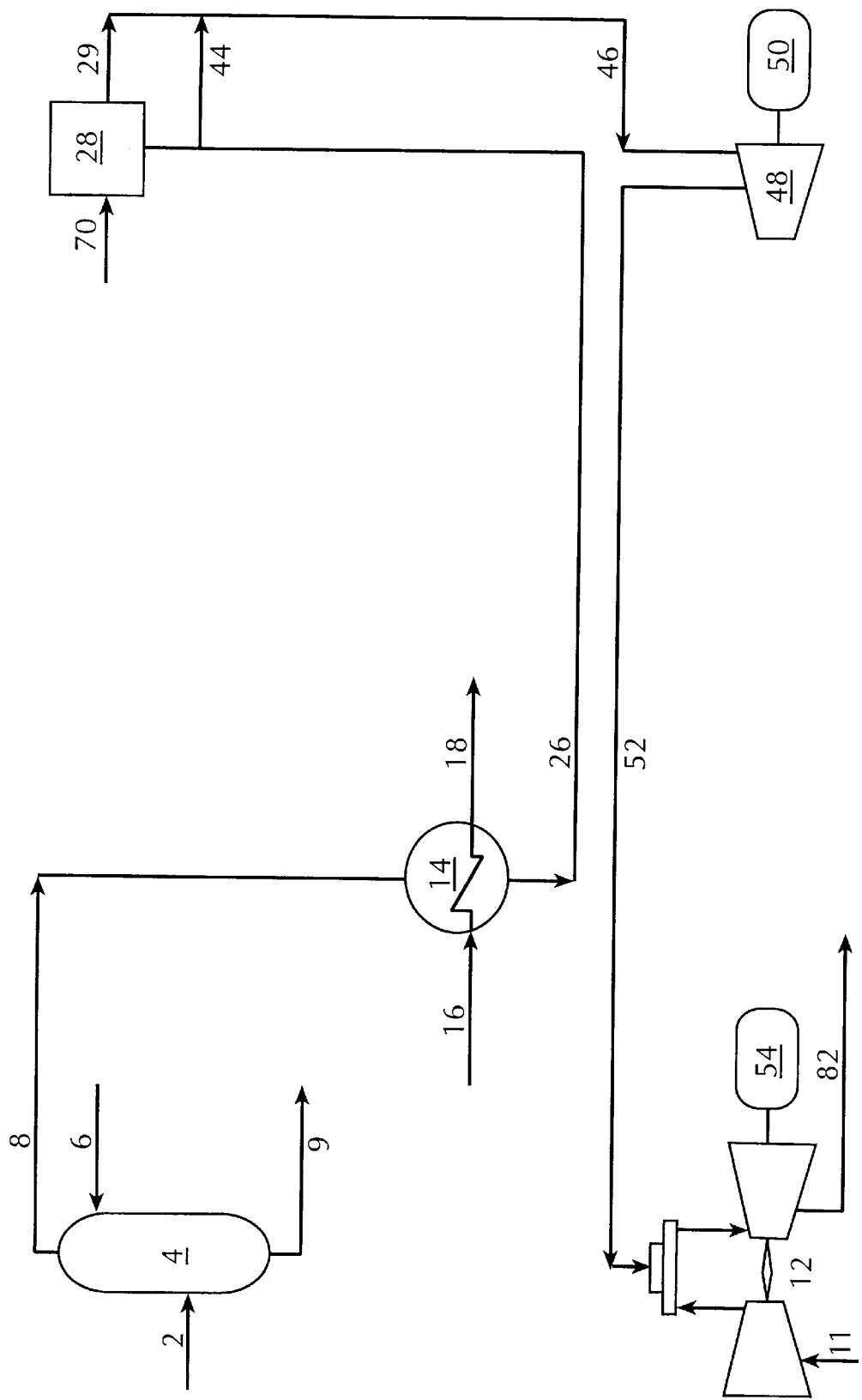
FIG. 3 is a schematic flow diagram of an embodiment using high pressure oxygen from an air separation unit as the oxygen source for partial burning of the syngas in a combustor.

FIG. 3 is a simplified process which uses purified oxygen rather than the oxygen and air as the oxidant to burn part of the syngas to increase the temperature. Here the bleed air processing system disclosed in FIG. 1 is replaced by high pressure oxygen from an air separation unit (not shown), which is fed via line 70 into the combustor 28 and burned with the portion of the high pressure synthesis gas 26 from the acid gas removal unit or syngas saturator 4. The high pressure sweet synthetic gas 8 from the syngas saturator 4 enters heat exchanger 14 and exits via line 26 where it is directed to the combustor 28.

The advantage of this embodiment is that the oxygen is readily available at elevated pressure as a side stream or slip stream from the oxygen being fed to the gasifier. This embodiment can also be used to retrofit existing high pressure gasification power systems.

Figure 4:
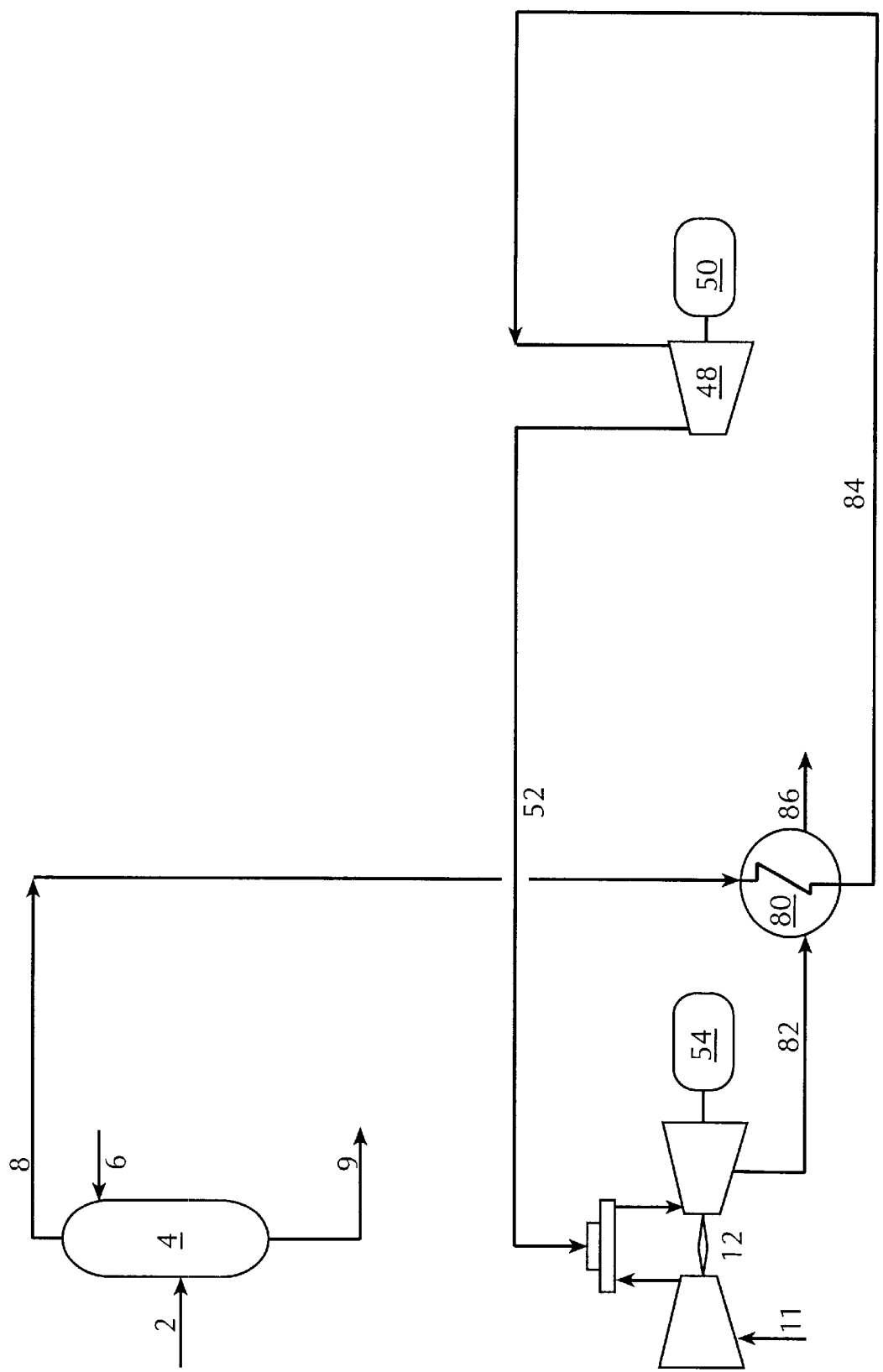
FIG. 4 is a schematic flow diagram of an embodiment where the syngas is heated by heat exchange with the combustion turbine exhaust in the tubes of a heat recovery steam generator.

FIG. 4 shows a variation of heating the syngas by heat exchange only, and thereby avoids burning part of it in the combustor 28. This embodiment is the most efficient configuration for heating the syngas to a high temperature. Syngas stream 8 saturated with water enters the heat recovery steam generator 80 where it is heated indirectly by the hot exhaust gases 82 exiting the combustion turbine 12.

The heating of the syngas 8 preferably occurs by routing the syngas through tubes in the heat recovery steam generator 80, similar to the way steam is superheated, although indirect heating can also be used. Because of the high temperatures available from the combustion turbine exhaust, the syngas can be readily heated to a temperature of from about 700° F. to about 1000° F. without burning any syngas and exists as stream 84.

Using heat directly from the heat recovery steam generator 80 is more efficient for heating the syngas in the expander 48 than burning a portion of the syngas with oxygen and eliminates the energy associated with the oxygen production. With the expander 48 located immediately upstream of the combustion turbine 12, this is a more practical embodiment than having the expander 48 located in the middle of the cooling train where a very long syngas transfer line or pipe would be required.

Thus, the expander 48 can be positioned on the heated syngas line 84 immediately upstream of the combustion turbine 12. This eliminates any need to cool the expander exhaust gas and reduces cost.

The inlet temperature of the expander 48 is preferably set to obtain a 550° F. exhaust temperature for the exiting fuel gas 52 and allow the use of standard high temperature fuel control valves on the fuel gas feed 52 to the combustion turbine 12. In general, this requires a feed temperature in the range of from about 800° F. to about 1000° F. for the heated syngas feed 84 to the expander 48. The feed 84 to the expander 48 can be preheated by any of the disclosed means, including heat transfer to about 550° F. with steam or other process streams. The balance of the heating to a temperature of about 800° F. and above can be accomplished by oxygen or air firing within the syngas in the combustor 28 or by heat exchange in the heat recovery steam generator 80.

The syngas saturator 4 can be replaced by a nitrogen saturator. For an integrated air separation unit design, the fuel gas and nitrogen streams have almost the same flow rates and this variation would have little impact on cost.

The expander can be coupled to and drive a nitrogen compressor, eliminating the need for a generator and its associated electrical capital cost and efficiency loss.

This invention has several advantages. First it can provide a low BTU/SCF fuel which can be controlled at the optimum BTU content level to provide efficient combustion and minimum $NO_x$. It can eliminate the need for nitrogen compression from the air separation unit to control the BTU content, eliminating the need to compress inert gas from a relative low pressure level. It eliminates sulfur from the gas prior to expansion, improving the reliability and decreasing the investment cost for the expander unit. It maximizes the temperature of the gas going to the expander which will allow maximum power production and improve the efficiency of the overall cycle when using the expander. It can allow efficient gasification power production using a standard pressure air separation unit design or pipeline oxygen. It can reduce sulfur emissions to parts per million (ppm) levels when a high temperature desulfurization unit is incorporated.

The system can be bypassed when required for maintenance with minimum impact on the power cycle. In the bypass mode, steam injection could be used to maintain low $NO_x$ production and the syngas fuel could go directly from the syngas saturator into the combustor.

What is claimed is:

1. In a system for increasing the efficiency of a power generating unit wherein a synthesis gas at elevated temperature and pressure is produced at a source by the partial oxidation reaction of a hydrocarbonaceous fuel in a gasifier and wherein the synthesis gas is used as a fuel in the power generating unit to produce power, the improvement which comprises locating a high temperature gas expander immediately upstream of the power generating unit; a combustor immediately upstream of the high temperature gas expander; the gas expander being also connected through a bypass around the combustor to the source of the synthesis gas.

2. The system of claim 1, also including a synthesis gas saturator and heat exchanging equipment upstream of the high temperature gas expander.

3. The system of claim 1, also including at least one heat exchanger connected in series to an air supply from the power generating unit, an air saturator connected in series with the heat exchanger, and a compressor connected in series with the air saturator.

4. The system of claim 2, also including a high temperature desulfurization system for removing sulfur from the gases exiting the combustor.

5. The system of claim 1, wherein the power generating unit is a gas turbine.

6. The system of claim 1, wherein a high-pressure oxygen source is connected in series with the combustor.

7. In a process for increasing the efficiency of a power generating system wherein a synthesis gas at elevated temperature and pressure is produced by the partial oxidation reaction of a hydrocarbonaceous fuel in a gasifier, and wherein said synthesis gas is used as a fuel to generate power in a combustion turbine, and wherein said synthesis gas is cleaned and cooled before fueling said combustion turbine, the improvement which comprises:

(a) combusting a portion of the synthesis gas to form a combustion gas;

(b) combining the combustion gas with the uncombusted portion of the synthesis gas to form a combined gas mixture;

(c) expanding the volume of the combined gas mixture by reducing its pressure in an expansion unit to form an expanded gas mixture; and (d) extracting power from the expanded gas mixture in a generator coupled to the expansion unit immediately before using the expanded gas mixture as a fuel for the combustion turbine.

8. The process of claim 7, wherein the combined gas mixture undergoes high temperature desulfurization prior to forming the expanded gas mixture.

* * * * *

UNITED STATES PATENT AND TRADEMARK OFFICE
CERTIFICATE OF CORRECTION

PATENT NO : 6,061,936
DATED : May 16, 2000
INVENTOR(S) : Frederick C. JAHNKE

It is certified that error appears in the above-identified patent and that said Letters Patent are hereby corrected as shown below:

In column 1, below the title of the invention, insert --This application claims the benefit of U.S. Provisional Application No. 60/058747 filed Setpember 12, 1997-- .

Signed and Sealed this

First Day of May, 2001

*Attest:*

NICHOLAS P. GODICI

*Attesting Officer*    Acting Director of the United States Patent and Trademark Office